(12) United States Patent
Iaconis

(10) Patent No.: US 11,209,845 B2
(45) Date of Patent: Dec. 28, 2021

(54) MODULAR WALL-MOUNTED ELECTRICAL CONTROL DEVICE

(71) Applicant: Jean-Louis Iaconis, Burnaby (CA)

(72) Inventor: Jean-Louis Iaconis, Burnaby (CA)

( * ) Notice: Subject to any disclaimer, the term of this patent is extended or adjusted under 35 U.S.C. 154(b) by 0 days.

(21) Appl. No.: 15/461,039

(22) Filed: Mar. 16, 2017

(65) Prior Publication Data
US 2017/0273203 A1 Sep. 21, 2017

Related U.S. Application Data

(60) Provisional application No. 62/309,458, filed on Mar. 17, 2016.

(51) Int. Cl.
| | | |
|---|---|---|
| H02B 1/48 | (2006.01) | |
| G05D 23/19 | (2006.01) | |
| H02G 3/12 | (2006.01) | |
| H02G 3/08 | (2006.01) | |
| H02G 3/18 | (2006.01) | |
| H01R 25/00 | (2006.01) | |
| H02G 3/14 | (2006.01) | |
| H01R 24/60 | (2011.01) | |
| H01R 13/74 | (2006.01) | |

(52) U.S. Cl.
CPC ....... *G05D 23/1919* (2013.01); *H01R 25/006* (2013.01); *H02B 1/48* (2013.01); *H02G 3/081* (2013.01); *H02G 3/12* (2013.01); *H02G 3/14* (2013.01); *H02G 3/18* (2013.01); *H01R 13/748* (2013.01); *H01R 24/60* (2013.01)

(58) Field of Classification Search
None
See application file for complete search history.

(56) References Cited

U.S. PATENT DOCUMENTS

| | | | | |
|---|---|---|---|---|
| 9,640,962 | B2 * | 5/2017 | Hernandez Ramirez | ................... H02G 3/32 |
| 2002/0050807 | A1 * | 5/2002 | Janik | ..................... G06F 1/1632 320/137 |
| 2005/0184856 | A1 * | 8/2005 | Pourchot | ............ H01R 13/7038 340/5.61 |
| 2008/0013909 | A1 * | 1/2008 | Kostet | .................. G02B 6/4457 385/135 |
| 2009/0209136 | A1 * | 8/2009 | Yamamoto | ........... H01R 25/006 439/638 |
| 2009/0247006 | A1 * | 10/2009 | Thompson | ............. H02G 3/121 439/527 |
| 2010/0288526 | A1 * | 11/2010 | Meyer | .................... H02G 3/086 174/58 |
| 2013/0335020 | A1 * | 12/2013 | Moore | .................... H02J 50/70 320/109 |
| 2014/0093057 | A1 * | 4/2014 | Hazani | ................. H01R 13/719 379/93.06 |

(Continued)

*Primary Examiner* — Courtney L Smith
(74) *Attorney, Agent, or Firm* — Oyen Wiggs Green & Mutala LLP

(57) ABSTRACT

A family of wall-mounted electrical fixtures, both for lighting control and electrical power or signal delivery, having a modular design. Said modular design predominately isolating those components that are directly connected to in-wall wiring within a wall-mounted base and low-voltage control and communication components, such as sensors, user-interface elements, programmable logic and wireless communication modules, within an aesthetically-appealing, easily-detachable faceplate assembly.

22 Claims, 12 Drawing Sheets

(56) References Cited

U.S. PATENT DOCUMENTS

| | | | |
|---|---|---|---|
| 2014/0170902 A1* | 6/2014 | Binder | H01R 31/005 439/620.01 |
| 2015/0163867 A1* | 6/2015 | Recker | H05B 45/10 315/250 |
| 2015/0228419 A1* | 8/2015 | Fadell | G08B 17/00 307/112 |
| 2015/0255932 A1* | 9/2015 | Dicks | H01R 13/6683 307/326 |
| 2015/0295374 A1* | 10/2015 | Gorman | H01H 11/0006 439/189 |
| 2015/0351983 A1* | 12/2015 | McNeely | A61B 5/0006 370/310 |
| 2015/0357762 A1* | 12/2015 | Green | H01R 13/652 439/95 |
| 2016/0233605 A1* | 8/2016 | Hernandez Ramirez | H02G 3/32 |
| 2017/0162985 A1* | 6/2017 | Randall | H01R 13/6675 |
| 2017/0338605 A1* | 11/2017 | Payet-Burin | H01R 13/73 |

* cited by examiner

MODULAR WALL-MOUNTED ELECTRICAL CONTROL DEVICE

INCORPORATION BY REFERENCE

This application claims the benefit of U.S. Provisional Application No. 62/309,458 filed Mar. 17, 2016, which is incorporated herein by reference.

FIELD OF THE INVENTION

This invention relates to wall-mounted lighting controls and electrical receptacles, in particular those providing a modular design and/or intelligent controls such as wirelessly-programmable and/or sensor-based electrical controls.

BACKGROUND OF THE INVENTION

In most conventional buildings, both residential and commercial, electrical control devices are used for controlling connected electrical loads such as lights, fans, switched receptacles and the like. These control devices typically take the form of a switch or button providing either on/off control or variable power control, such as may be required for dimmable lighting. Basic on/off control is usually achieved through the use of a push, or toggle, button and dimmable electrical control is typically implemented with a user-actuated slider or rotary dial that adjusts lighting intensity proportionally to the amount a slider is translated or dial rotated, respectively.

Other, less common, electrical controls may offer alternative user interfaces. Such controls may use touch-sensitive elements in lieu of mechanical buttons and/or may use gesture recognition to perform analogous dimming control as would typically be performed by a physical slider or dial (i.e. sliding a finger up or down, using two fingers to rotate a virtual dial clockwise or counter-clockwise, or spreading two fingers apart or pinching two fingers together to increase or decrease lighting intensity, respectively).

Further alternative electrical controls also exist that focus on offering additional features and functionality beyond just limited on/off and dimming control. Such additional features may include user-programmable timers for automatically turning connected electrical loads on and/or off after specified times intervals, motion sensors for automatically turning connected electrical loads on and/or off based on detected room occupancy, or additional wiring for communicating with a local central control server as part of a whole-home automation system.

Yet another class of alternative electrical controls that may include wireless communication capabilities using Bluetooth, WiFi, Z-Wave, Zigbee or other similar protocols to enable remote operation of electrical controls from another local electrical control (i.e. wired electrical switch or wireless handheld remote control), a local central control sever, a remote Web application server, or a wireless electronic device such as a smartphone, smart watch, tablet or personal computer.

While numerous prior art solutions exist, and may be adequate for specific applications, they each have shortcomings. For example, one common shortcoming of conventional electrical controls is their limited functionality. Said controls are typically only capable of controlling a single connected load and even performing common functions such as controlling a common load from multiple switches, such as staircase lighting from switches located at the top and bottom of the staircase, is difficult to accomplish, typically requiring additional dedicated wiring. Conventional electrical controls typically also lack any programmability, energy monitoring, or energy conserving features that may be desired by an end user.

A second shortcoming of incumbent electrical controls is that often, in an effort to address the aforementioned shortcoming, programmable controls are added to conventional switches in the form of additional buttons, touch-sensitive elements, or the like. Unfortunately, these result in very complex user interfaces that are difficult to program and use and are aesthetically unappealing, resulting in a poor user experience.

A third common shortcoming of prior art solutions is their failure to offer any aesthetically-appealing alternatives to the typical design of conventional electrical controls. Even solutions that incorporate alternative user interfaces and advanced features and functionality relative to conventional electrical controls typically conform to standard, uninspired designs; limiting any aesthetic improvements to concealing otherwise exposed faceplate fasteners or replacing physical buttons, sliders or rotary dials with touch-sensitive equivalent components.

A final shortcoming of prior art solutions is a requirement for a physical connection to the local load being controlled via existing wiring. While this requirement may be readily satisfied when building a new home or commercial structure, or performing extensive renovations thereto, it makes reconfiguring any electrical loads and controls in an existing structure very challenging. Typically, such reconfiguration requires modification of the wiring within walls and ceilings and extensive repairs thereto to restore said walls and ceilings to their prior condition once wiring changes are completed.

Therefore, while there are many known wall-mounted devices for controlling electrical loads, all require varying degrees of compromise in utility, usability, aesthetics and upgradeability.

SUMMARY OF THE INVENTION

The object of the present invention is to provide a modular wall-mounted electrical control that overcomes at least one shortcoming of existing solutions, which either have limited functions, are difficult to use, are aesthetically unappealing or make upgrading and reconfiguring room controls and their connected loads very difficult.

In one embodiment, the present invention addresses the limited functionality of conventional electrical controls by incorporating one, or more, sensors including, but not limited to, motion, ambient light, sound, video, temperature, humidity or the like, and a microcontroller to process the signals from said sensors. These elements may provide the electrical control with ambient awareness such that it may respond accordingly to user interactions based on sensor inputs. For example, a control may automatically illuminate a backlight feature if it detects a user approaching in a low ambient light scenario to assist with finding the control in the dark. As another example, an electrical control may automatically adjust the intensity of connecting lighting loads to maintain a constant ambient lighting level. If the amount of natural lighting entering a room increases, as might be the case at sunrise, the control may reduce the intensity of, or even turn off, the lighting in a room or if the natural light in a room decreases, as might be the case at sunset, the electrical control may automatically increase the intensity of lighting in a room to compensate for any reduction in natural light.

In some embodiments wherein sensors and a microcontroller are included in a wall-mounted electrical control, a communication module, either wired or wireless, may also be incorporated into said electrical control for extending its capabilities. Said communication module may be used to share sensor signals with other intelligent control devices to extend those devices' sensing range or may receive inputs from remote sensors to extend the electrical control's effective sensing range. For example, if one electrical control detects motion in a low ambient light scenario, it may communicate that sensor, input with other controls in the vicinity such that multiple controls may illuminate their backlights, rather than just the one control sensing motion, to illuminate the perimeter of an entire room or the length of a hallway to assist with navigating in the dark. As another example, in embodiments wherein temperature or humidity sensors are incorporated into electrical controls, said sensors may communicate with a central thermostat to provide a spatial mapping of the temperature and humidity of all occupied rooms in a building such that climate may be more accurately and comfortably controlled. As yet another example, in embodiments wherein sensors may include one, or more, motion, sound or video sensors, said sensors may act as extensions of, or replacements for, the motion and camera sensors typically found in security and burglar alarm systems.

Some embodiments of the disclosed invention may also enable third-party devices to directly, or indirectly, interact with or control the wall-mounted electrical control. For example, the unlocking of an intelligent door lock may send a signal to nearby lighting controls to turn on the lights as a user enters a building or conversely the locking of said intelligent lock may signal all nearby lighting controls to turn off, if inadvertently left on. As another example, a security or burglar alarm system detecting motion or intrusion may signal to turn on all of the lights in a building in an attempt to persuade the intruder to leave or provide adequate lighting in said building for security cameras to capture images of the detected intruder. Similarly, the ringing of a doorbell or telephone or the arrival of an email, text message or other digital alert may be used to illuminate particular electrical controls as a visual aid of said incoming notifications. As yet another example, wireless communication devices such as smartphones, smart watches, tablets or personal computers may be used to query the status of (i.e. current on/off state, dimming level, power consumption, etc.), and control, connected electrical loads; enabling users to control their connected electrical devices locally, from within the same building, or remotely from anywhere with an internet connection.

Some embodiments of the present invention may further address the usability shortcomings of prior art solutions by incorporating a single, large, physical button, with one or more tactile, audible or visual feedback elements, rather than using multiple small buttons, which may be difficult to find and press, or touch-sensitive interfaces, which cannot be operated by a gloved hand, elbow, shoulder, or other inanimate object that may be occupying a user's hands, to perform advanced functions. The present invention may instead rely on a single, large button to preserve the simplicity and ease of use of conventional control devices, while enabling advanced functionality through the use of sensors, microcontrollers, and configurable button responses. For example, electrical controls may be configured to respond differently when a button is pressed in different manners, such as a single tap, rapid double tap or press-and-hold. As another example, electrical controls may be configured to respond differently based on sensor inputs in addition to the manner in which a button is pressed, such as turning on the lights to full brightness if a button is pressed when the the ambient light level is low during the day, or turning on the lights to a low brightness level if said button is pressed during the night, when a user may be getting up from interrupted sleep and would be disturbed by bright lights. As yet another example, pressing a button on an electrical control located near an entry/exit door may only turn off the indoor lights during the day or may simultaneously turn off indoor lights and turn on outdoor lights in the evening or at night.

In yet another embodiment of the present invention, the disclosed wall-mounted electrical control may be fashioned as an electrical receptacle rather than a button or switch. Said receptacle possessing similar functionality and sensors as disclosed above, but instead of controlling connected electrical loads via a tactile button, the electrical receptacle may be configured to automatically turn on when a qualified electrical load is plugged in or be remotely turned on/off by another electrical control, central control server or wireless communication device. In cases wherein the electrical control automatically turns on only when a qualified electrical load is plugged in, said electrical control may act as a child and/or pet safe receptacle since no AC line voltage is presented to any user-accessible components when not in use. In cases where the receptacle may be paired with another control device for remotely actuating said receptacle, this may address another shortcoming of prior art solutions, by enabling the reconfiguration of electrical controls and their connected loads without rewiring an existing building structure. For example, a wall-mounted control switch may be paired with one, or more, control receptacles to control wired overhead lighting during the day or when ambient lighting levels are high, and floor-standing or table lamps connected to said paired control receptacles, at night, or when ambient lighting levels are low.

Furthermore, to address the aesthetic shortcomings of prior art solutions, embodiments of the present invention may incorporate bold designs and premium materials of construction that challenge the conventional definition of what electrical switches and receptacles should look like. These may include unique actuator and faceplate designs, incorporate dramatic lighting effects and/or utilize materials of construction that complement modern interior design trends including, but not limited to, the use of wood, steel, aluminum, copper, carbon fibre, fabrics, granite, slate, marble, glass, and the like, rather than typical plastic materials commonly used in the construction of conventional electrical controls.

Finally, in order to facilitate customization to coordinate with unique styles of individual homes and offices as well as enable updating and upgrading to keep pace with technological evolution and/or changes in design style preferences, embodiments of the present invention may be fashioned as a two, or more, part assembly. One component of said multi-part assembly being a wall-mounted base affixed to a standard electrical wall box and connected to existing in-wall AC line power. Said wall-mounted base containing all of the AC line-voltage power switching components and AC-DC power converter electronics. A second component being a detachable faceplate assembly incorporating all aesthetic user-interface elements, sensors, microcontroller and communications interfaces. Said secondary component being detachably connected to the wall-mounted base such that all aesthetic, ambient awareness and programmable components may be upgraded without the use of any tools simply by replacing the front faceplate assembly. Power to the detachable faceplate assembly may be supplied from the AC-DC converter in the wall mounted base such that the only electrical interface between the wall-mounted base and the detachable faceplate assembly is a low-voltage interface, negating the need to disconnect AC power to the electrical control when performing a faceplate upgrade.

Other embodiments of the disclosed invention will be or become apparent to one skilled in the art upon review of the following drawings and detailed description. It is intended that all such additional embodiments be included within this description, be within the scope of the disclosed invention, and be protected by the accompanying claims.

BRIEF DESCRIPTION OF THE DRAWINGS

Embodiments of the present invention will now be described, by way of example only, with reference to the attached Figures, wherein.

DETAILED DESCRIPTION

The present invention is directed to a modular wall-mounted electrical control, fashioned as either an electrical switch or receptacle and fitting within a standard electrical receptacle box.

Reference is made below to specific elements, numbered in accordance with the attached figures of one embodiment and several variations of that embodiment. The discussion below should be taken to be exemplary in nature and not as limiting of the scope of the present invention. The scope of the present invention is defined in the claims and should not be considered as limited by the implementation details described below, which as one skilled in the art will appreciate, can be modified by replacing or rearranging elements with equivalent functional or aesthetic elements.

Figure 1:
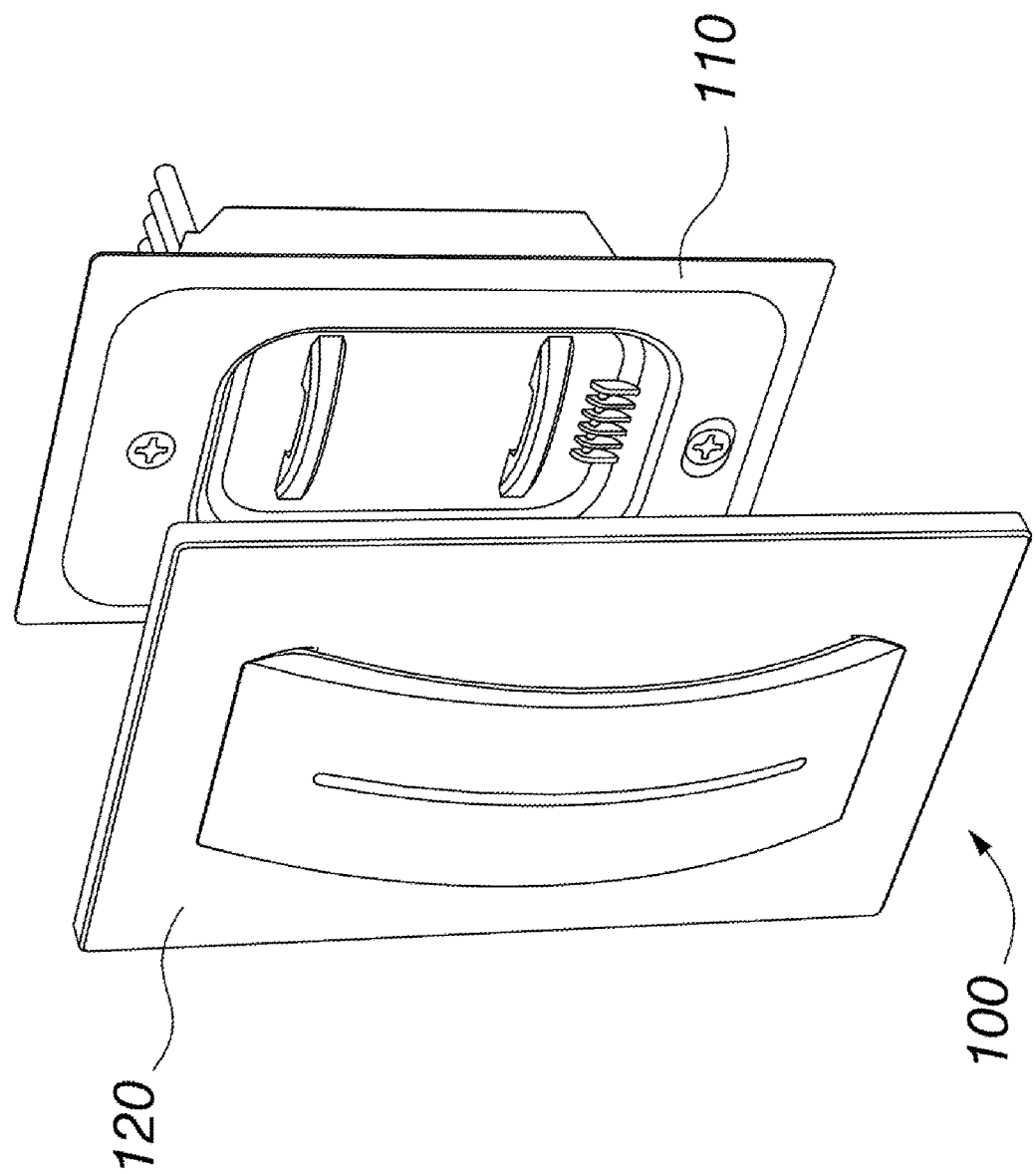
FIG. 1 is a first exploded perspective view of an embodiment fashioned as a lighting control switch.

An example of a first embodiment of a modular wall-mounted electrical control in accordance with the present invention is shown in FIG. 1. The modular wall-mounted electrical control 100 generally comprises a wall-mounted base 110 and a detachable faceplate assembly 120.

Figure 2:
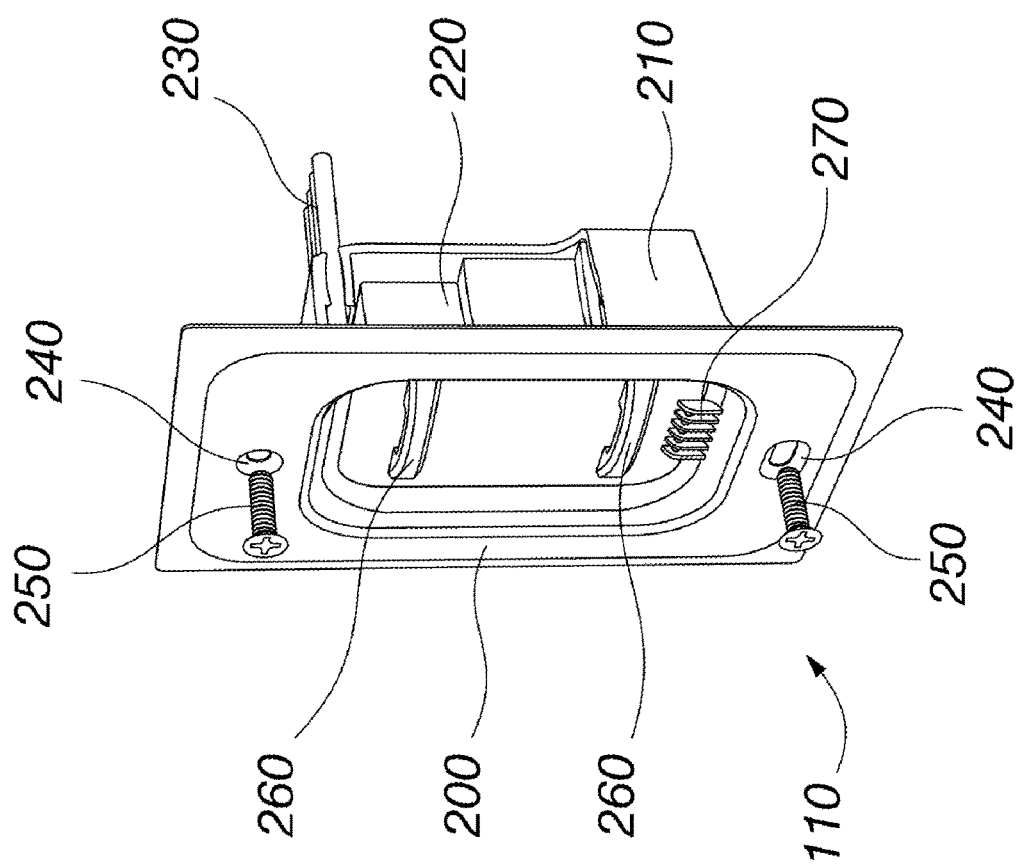
FIG. 2 is a front perspective view of the wall-mounted base of FIG. 1, partially sectioned to reveal internal components.

According to various embodiments, the wall-mounted base 110 compromises an outer enclosure, consisting of a front 200 and a rear 210 housing, an electronics assembly 220 and an electrical interface 230 for connecting to existing wiring within a building structure's walls as illustrated in FIG. 2.

Front housing 200 may be formed as, or incorporate features of, a wall plate with mechanical interfaces 240 such that it may be secured to a wall-mounted electrical outlet box, in place of a standard wall plate, with screws 250 similarly to the manner in which a typical wall plate is installed over an outlet box. Front housing 200 may be sized to fully cover the opening of a wall-mounted electrical outlet box to which it is secured to shield users from any exposed high-voltage wires and connections that may be present within said outlet box. Furthermore, front housing 200 may be fashioned to include faceplate mechanical interfaces 260 and electrical interfaces 270 for securing and powering, respectively, detachable faceplate assembly 120.

Figure 3:
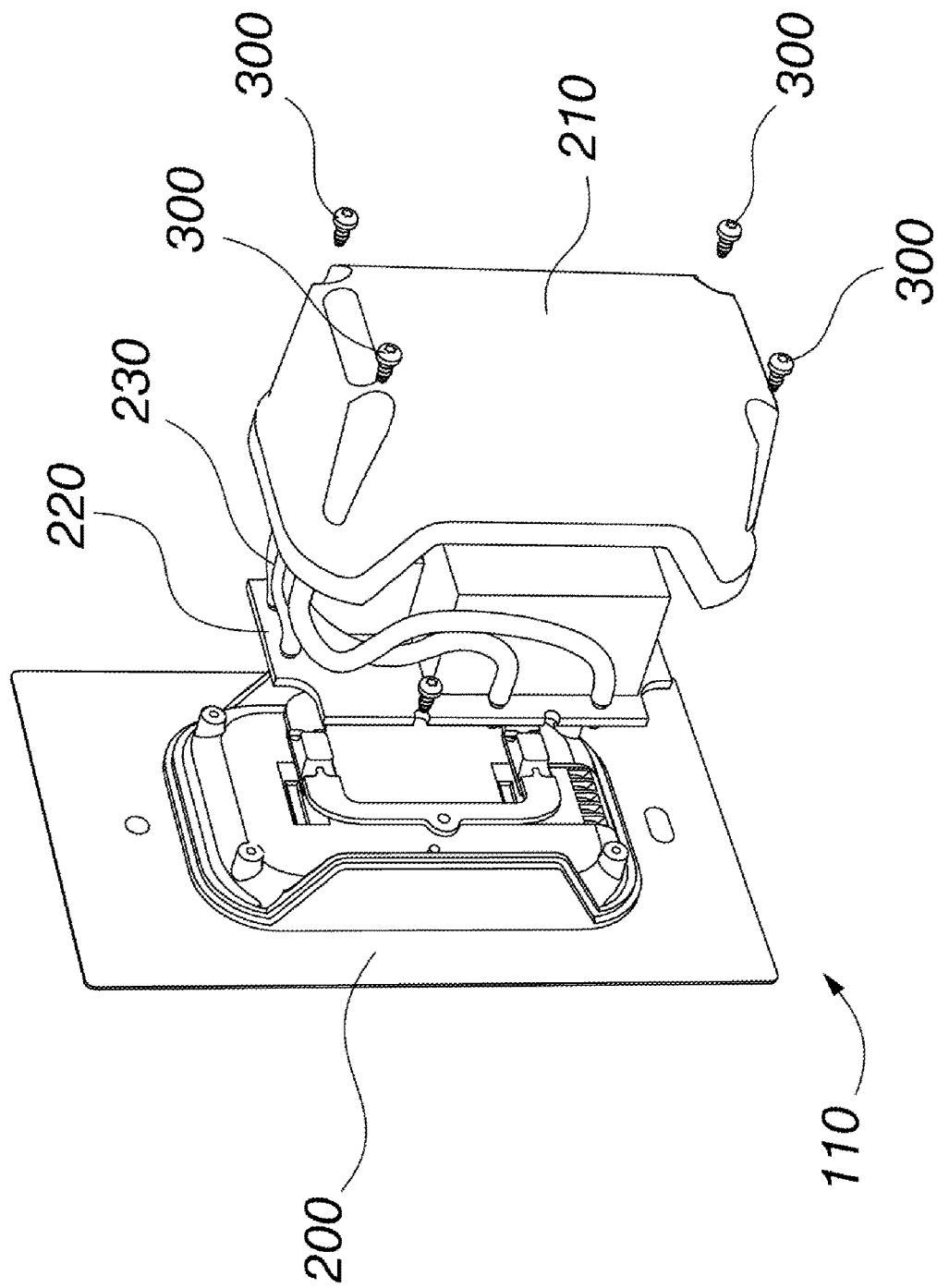
FIG. 3 is an exploded rear perspective view of the wall-mounted base of FIG. 1.

Rear housing 210 may fully enclose all, or most, internal components of wall-mounted base assembly 110 and may be attached to front housing 200 with screws 300 (as illustrated in FIG. 3) or other removable or irremovable attachment means including, but not limited to, bolts, rivets or alternative mechanical fasteners, heat stakes, snap fits, interference fitting features, ultrasonic welds, laser welds or adhesive. Said rear housing 210 is sized to fit within a standard electrical outlet box and is typically fully concealed within the wall once wall-mounted base assembly 110 is securing to an electrical outlet box or wall.

Both front 200 and rear 210 housings are typically fabricated from an electrically-insulating material, such as a thermoplastic or thermoset material compatible with relevant electrical and consumer product safety requirements as may be applicable in each geographic region of use. Alternate materials of construction are also possible, including metals, woods, ceramics, stone, concrete, glass and composite materials provided they do not create electrical short circuits, expose potentially dangerous electrical voltages to end users, or pose any potential fire, or other, hazards that may preclude them from meeting applicable electrical or fire safety standards.

Figure 4:
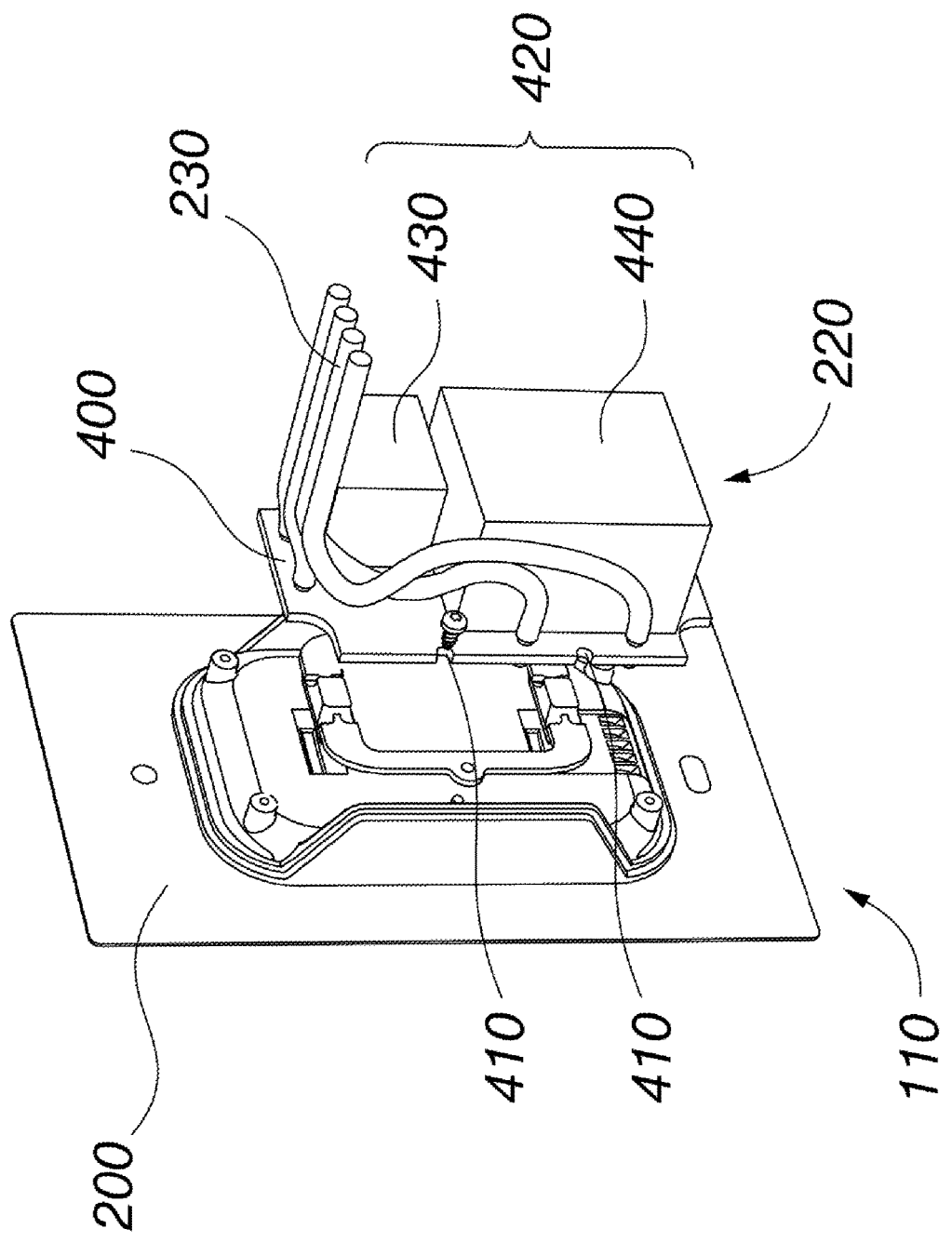
FIG. 4 is another view thereof with rear cover removed to reveal internal components.

Electronics assembly 220 is mounted within the enclosure formed by front housing 200 and rear housing 210. Electronics assembly 220 comprises a printed circuit board 400 sized to fit within said enclosure, which may incorporate mounting features 410 for securing to either the front housing 200 or rear housing 210, electrical interface components 230 (which extend through rear housing 210) for electrically connecting to existing wiring within a building structure's walls and electronic components 420, which are electrically connected to electrical traces on printed circuit board 400 so as to create functional electrical circuits as depicted in FIG. 4.

Mounting features 410 on printed circuit board 400 may include, but are not limited to, holes, slots or board edge geometry to which screws, bolts, rivets, alignment pins, heat stakes, snap fits, or interference fitting features may mate with, or dedicated regions on printed circuit board 400 suitable for establishing an ultrasonic weld, laser weld or adhesive bond. Mating features to those found on printed circuit board 400 may be included on either front housing 200 or rear housing 210 such that the printed circuit board 400 may be secured within wall-mounted base 110 once assembled.

Electrical interface components 230 may comprise wires connected on one end to printed circuit board 400 and free hanging, protruding through rear housing 210, on the other end such that they may be connected to existing building wiring by splicing or with the use or wire nuts, or equivalent connectors, or may comprise mechanical connectors directly attached to printed circuit board 400 such as screw terminals, spring-loaded connectors, push-in connectors, or posts, which protrude, or are accessible through, rear housing 210, to which building wiring may be directly connected without the use of intermediary wires.

Electronic components 420 typically comprise at least one load switching component 430, an alternating current to direct current (AC/DC) power converter 440 and a low voltage electrical connector 270 for interfacing with detachable faceplate assembly 120.

Load switching component 430 may comprise one, or more, physical switches, mechanical relays, solid state relays, transistors, of alternative electrical components and circuitry capable of connecting and disconnecting AC line voltage to a connected load at the rated current of said connected load. In embodiments wherein wall-mounted electrical control 100 is a switch, load switching component 430 may connect and disconnect power to one, or more, wired electrical circuits, such as those powering room lighting or electrical receptacles, while in embodiments wherein wall-mounted electrical control 100 is a receptacle, load switching components 430 may be used for connecting and disconnecting power to individual receptacle outlets of said wall-mounted electrical control 100.

AC/DC converter 440 may comprise an integrated circuit component, or a collection of components forming a suitable power conversion circuit, of which numerous topologies and designs are well-known to those skilled in the art. AC/DC converter 440 generates a low-voltage (typically less than 60V) direct current (DC) output, which may commonly include, but is not limited to, 24V, 12V, 10V, 6V, 5V, 3.3V, 3V or other voltage as may be required to power and/or communicate with low-voltage DC integrated circuit components chosen for any particular embodiment of the present invention. The low-voltage DC output from AC/DC converter 440 may be directed to power components on printed circuit board 400 such as LEDs, LCD displays, sensors (touch, motion, sound, light, temperature, humidity, electrical current, power, etc.), sound-generating devices, relays, switches, microcontrollers, wireless communication modules, or the like, and/or may be directed to faceplate electrical interface 270 for powering components within detachable faceplate assembly 120.

Faceplate electrical interface 270 serves as the primary low-voltage power and communication interface between wall-mounted base 110 and detachable faceplate assembly 120. Faceplate electrical interface 270 may comprise a multi-pin connector such as a fixed pin header, spring pin array, spring-loaded connector, exposed contact pads on printed circuit board 400, or the like. Independent contacts on electrical interface 270 may be used to transmit power from wall-mounted base 110 to detachable faceplate 120, signals from sensors or control electronics within wall-mounted base 110 to detachable faceplate 120 or signals from sensors or control electronics within faceplate 120 to wall-mounted base 110, such as may be required to actuate load-switching component 430 on printed circuit board 400 within base 110 from a remote signal originating in detachable faceplate 120.

Figure 5:
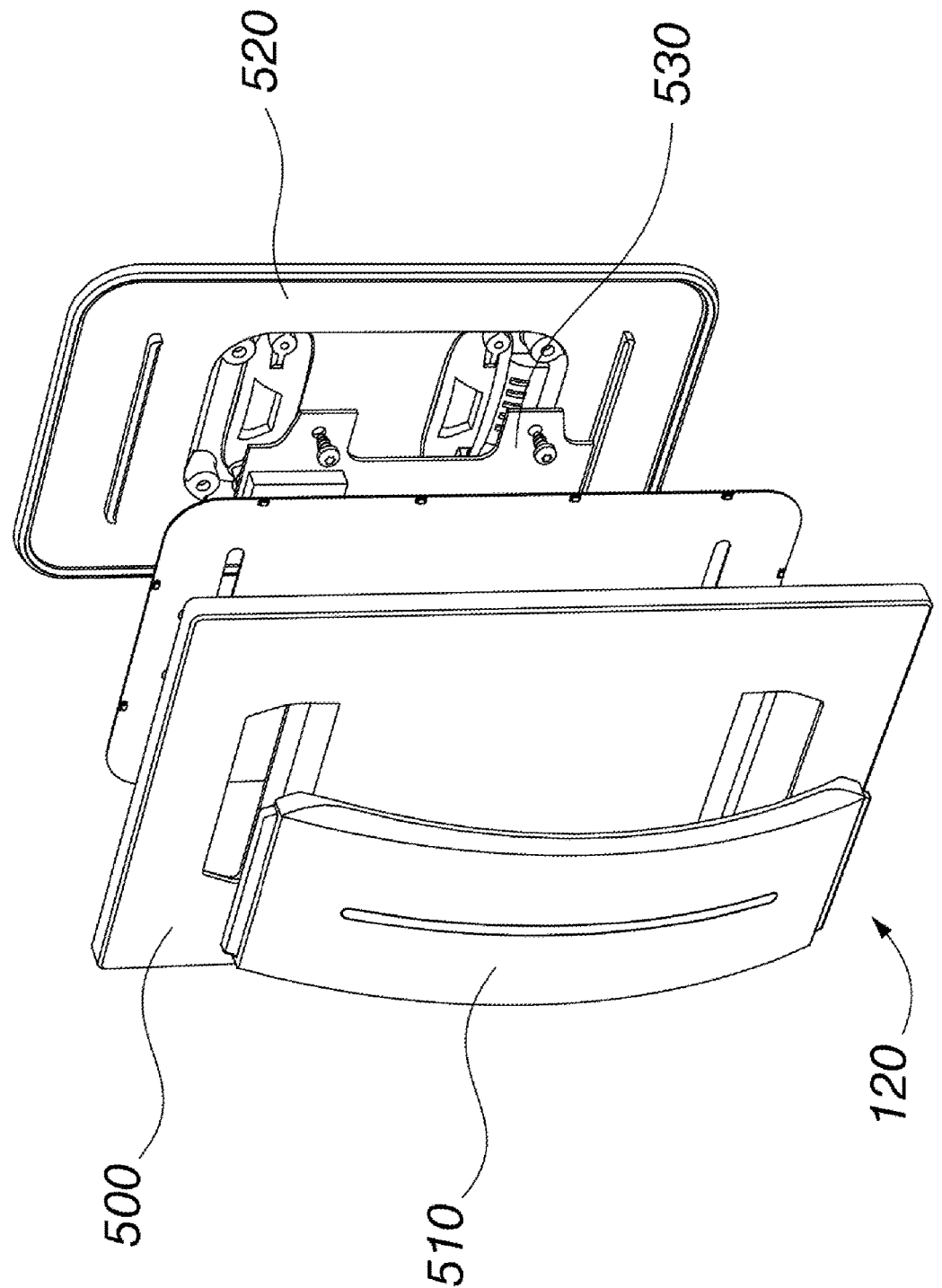
FIG. 5 is an exploded front perspective view of the faceplate assembly of FIG. 1.

Detachable faceplate assembly 120 may be fashioned in numerous distinct forms. In one embodiment of the present invention, detachable faceplate assembly 120 may be fashioned as a switch for turning on/off connected electrical loads including, but not limited to, lights or connected electrical receptacles. In said embodiment, detachable faceplate assembly 120 comprises a front housing 500, button assembly 510, rear housing 520 and electronics assembly 530 as illustrated in FIG. 5.

Front housing 500 serves as the key aesthetic element of the present invention's industrial design and as such can be customized to achieve multiple different appearances. It may be fabricated from thermoplastic or thermoset materials similar to materials traditionally used on conventional wall-mounted electrical controls or may be fabricated from more unconventional materials including, but not limited to, metals, woods, ceramics, stone, concrete, glass and composite materials provided they do not create electrical short circuits, expose potentially dangerous electrical voltages to end users, or pose any potential fire, or other, hazards that may preclude them from meeting applicable electrical or fire safety standards. Front housing 500 may also be painted or stained to match the décor of the room within which wall-mounted electrical control 100 is installed.

Figure 6:
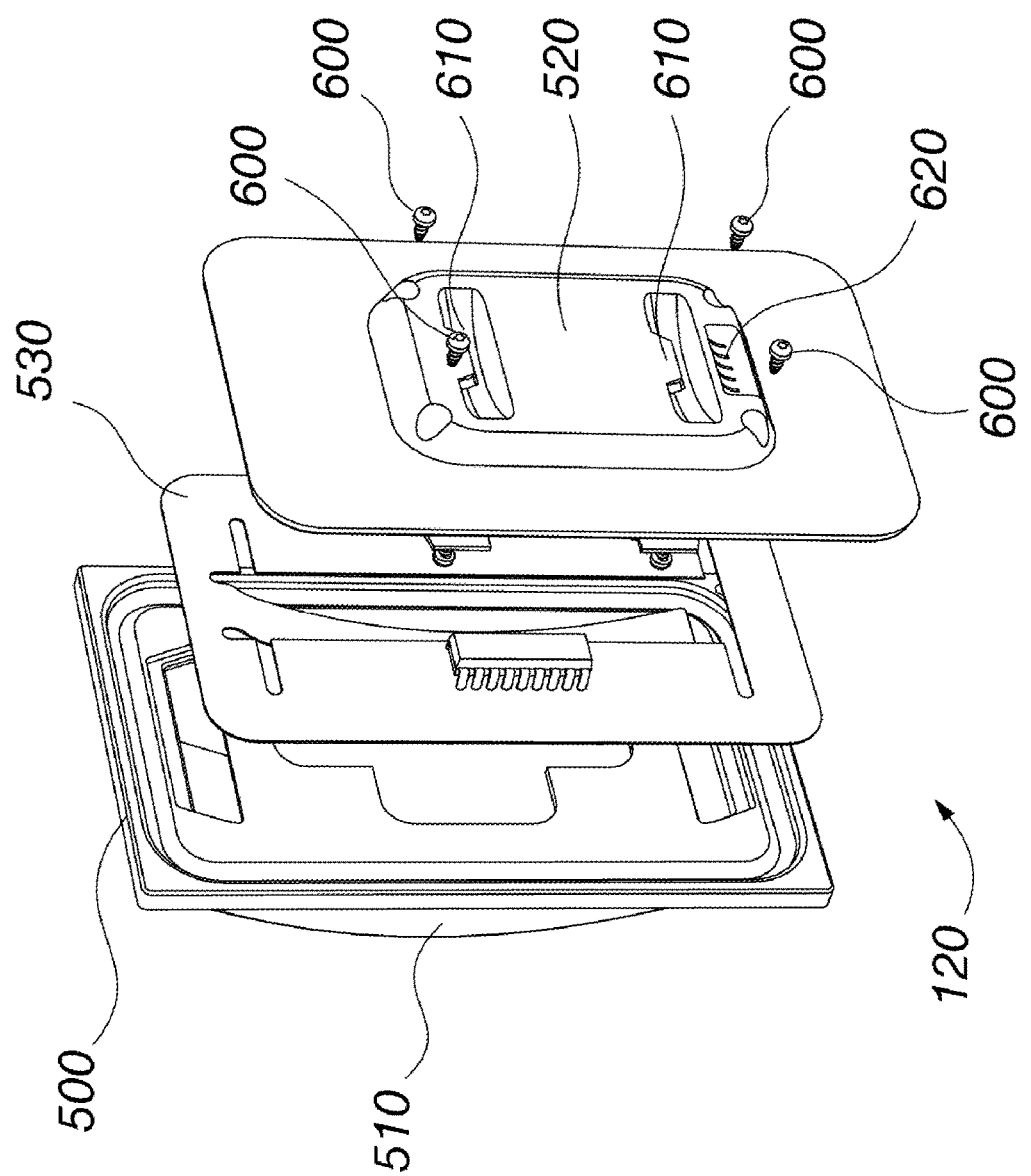
FIG. 6 is an exploded rear perspective view thereof.

Rear housing 520 may fully enclose all, or most, internal components of faceplate assembly 120 and may be attached to front housing 500 with screws 600 (as illustrated in FIG. 6), or other removable or irremovable attachment means including, but not limited to, bolts, rivets or alternative mechanical fasteners, heat stakes, snap fits, interference fitting features, ultrasonic welds, laser welds or adhesive. Rear housing 520 incorporates complementary mechanical interface features 610 and electrical interface features 620 to those found on front housing 200 of wall-mounted base 110 for enabling the detachable faceplate assembly 120 to be attached to, and electrically powered by and communicate with, wall-mounted base 110. Mechanical interface features 610 are fashioned such that they engage with mechanical interface features 260 on wall-mounted base front housing 200 without the use of any tools by using snap fitting features including, but not limited to, spring-actuated detents, magnetic couplings, friction fit features, or the like. Electrical interface features 620 are fashioned such they inherently engage with mating electrical interface features 270 on wall-mounted base front housing 200 when mechanical interface features 610 are engaged with mechanical interface features 260 and automatically disengage when the detachable faceplate assembly 120 is mechanically disengaged from wall-mounted base 110. Rear housing 520 may be fabricated from similar materials of construction as front housing 500, although rear housing 520 may not necessarily require the same level of aesthetic attention since it is often concealed once attached to wall-mounted base 110 in many embodiments.

Figure 7:
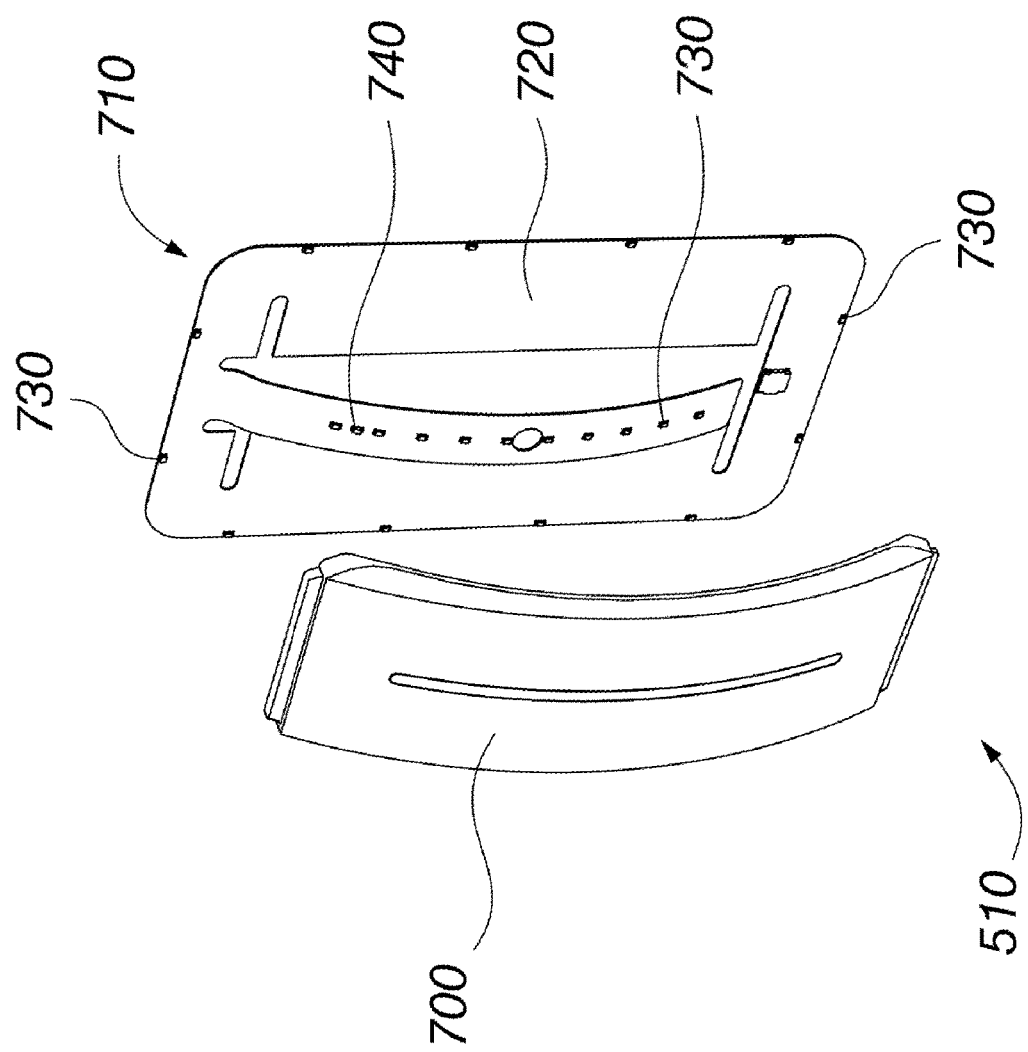
FIG. 7 is an exploded front perspective view of the button assembly of FIG. 1.

Button assembly 510 serves as the primary physical user interface to wall-mounted electrical control 100. Although numerous embodiments are possible, in typical embodiments, one example of which is illustrated in FIG. 7, button assembly 510 comprises a physical button 700 and one, or more, indicator light assemblies 710.

Physical button 700 may be fabricated from any of the materials that front housing 500 may be fabricated, although it is not a requirement that it be fabricated from the same material as front housing 500 in any particular embodiment.

Physical button 700 may be pressure-sensitive, touch-sensitive and/or proximity-sensitive and electrically coupled with electronics assembly 530 such that physical button presses, touches, or gestures performed on, or in close proximity to, the button may be converted into electrical signals and recognized as interactions. Said interactions may include a momentary button press, rapid double-tap, press-and-hold, sliding gesture and others, which electronics assembly 530 may be configured to recognize.

Indicator light assembly 710 on button assembly 510 comprises one, or more, printed circuit board 720, populated with light-emitting components 730, such as a single LED, a series of LEDs or LCD, OLED, or similar, displays, which may provide backlighting and visual status indication such as whether an electrical control is on or off or, in embodiments wherein wall-mounted electrical control 100 is a dimmable light switch, may illuminate proportionally to controlled lighting intensity. In some embodiments, sensors 740 such as ambient light, proximity, touch, motion, sound or others may also be disposed on indicator light assembly 710 as additional sources of input signals to electronics assembly 530 for determining appropriate responses as electronics assembly 530 may be configured to recognize.

Figure 8:
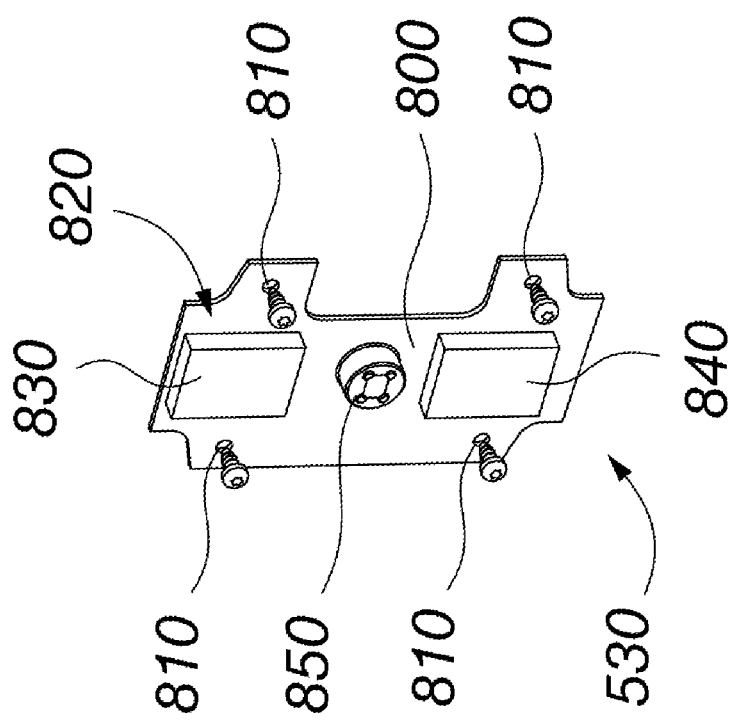
FIG. 8 is a front perspective view of the electronics assembly of the faceplate component of FIG. 1.
Figure 9:
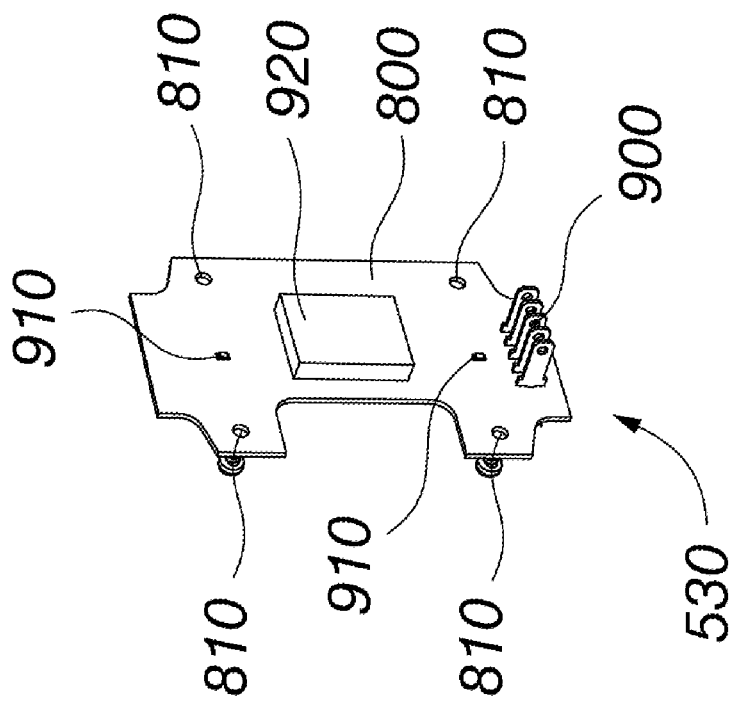
FIG. 9 is a rear perspective view thereof.

Electronics assembly 530 is mounted within the enclosure formed by front housing 500 and rear housing 520. Electronics assembly 530 comprises at least one printed circuit board 800 sized to fit within said enclosure, which may incorporate mounting features 810 for securing to either the front housing 500 or rear housing 520, electronic components 820, which are electrically connected to electrical traces on printed circuit board 800 so as to create functional electrical circuits and an electrical interface 900 to wall-mounted base, as depicted in FIG. 8 and FIG. 9.

Mounting features 810 on printed circuit board 800 may include, but are not limited to, holes, slots or board edge geometry to which screws, bolts, rivets, alignment pins, heat stakes, snap fits, or interference fitting features may mate with, or dedicated regions on printed circuit board 800 suitable for establishing an ultrasonic weld, laser weld or adhesive bond similar to mounting features previously described for mounting electronics assembly 220 into wall-mounted base 110 housing. Mating features to those found on printed circuit board 800 may be disposed on either front housing 500 or rear housing 520 such that the printed circuit board 800 may be secured within detachable faceplate 120 once assembled.

Electronic components 820 typically comprise a microcontroller or programmable logic component 830, a wireless communication module 840 and miscellaneous components and circuitry for powering and interfacing with sensors 850, such as motion, ambient light, sound, proximity or others as may be integrated into electronics assembly 530, and user interface components 910, such as LEDs, LCDs, sound generating devices, and the like. Programmable logic component 830 and wireless communication module 840 may be distinct integrated circuit components or comprise a single system-on-chip (SOC) component capable of performing both functions. Programmable logic component 830 is responsible for storing default behavioural configuration settings and responses, wireless pairing information, security, and user-configurable device settings while wireless communication module 840 enables transmission of control and communication signals between a programming device, such as a smartphone, tablet, laptop, desktop computer or purpose-built programming device and the electrical control device 100 or between multiple electrical control devices 100 that have been configured to communicate with each other.

Examples of user-configurable device settings that may be stored in programmable logic component 830 and modified via wireless communication module 840 include, but are not limited to:
- Device identification settings such as name, location, serial number, and the like;
- Security information such as password, known devices allowed to modify device settings, and/or known wireless networks or devices which have been granted access to communicate with, control, or be controlled by said device;
- Device electrical load control, backlight and button indicator light behaviours in response to sensor inputs, such as motion or sound detection, ambient light level and/or time of day;
- Device electrical load control, backlight and button indicator light behaviours in response to user interactions with button 510 such as single-tap, rapid double-tap, press-and-hold, sliding gestures, or the like, in addition to sensor inputs such as motion or sound detection, ambient light level and/or time of day.

In certain embodiments, electronics assembly 530 may also include onboard energy storage components 920, such as a rechargeable battery or capacitor, or energy harvesting components such that electronics assembly 530 may continue to be powered even when faceplate assembly 120 is detached from wall-mounted base 110 or in the event of a power failure at wall-mounted base 110. Energy storage components 920 enable configuring device settings when faceplate assembly 120 is detached from wall-mounted base 110, such as at the point of purchase before the device is unboxed or installed, and/or allows faceplate backlight and button lighting and sensor components to continue operating to provide emergency lighting in a power outage situation.

Electrical interface 900 serves as the mating half of faceplate electrical interface 270 on wall-mounted base 110 and is the primary low-voltage power and communication interface between wall-mounted base 110 and detachable faceplate assembly 120. Electrical interface 900 may comprise a multi-pin connector such as a fixed pin header, spring pin array, spring-loaded connector, or solder pads on printed circuit board 800, which may be contacted by a spring-loaded connector on mating faceplate electrical interface 270. Independent pins or pads on electrical interface 900 may be used to transmit power from wall-mounted base 110 to detachable faceplate 120, signals from sensors or control electronics within wall-mounted base 110 to detachable faceplate 120 or signals from sensors or control electronics within faceplate 120 to wall-mounted base 110.

Figure 10:
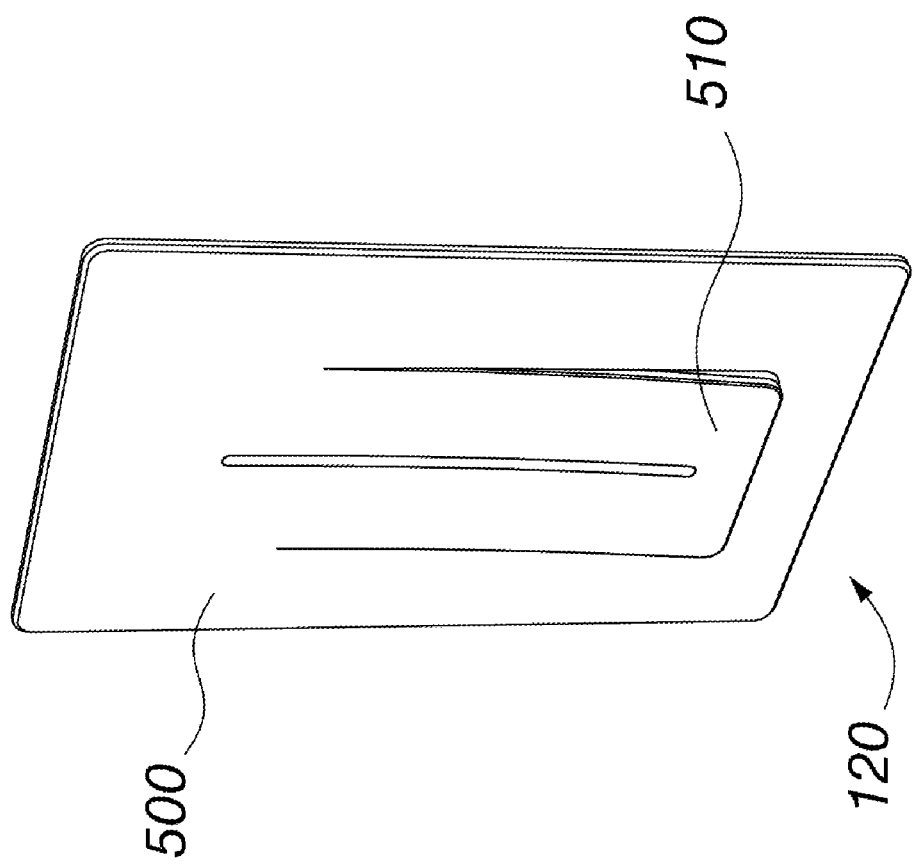
FIG. 10 illustrates an exemplary alternate embodiment of FIG. 1 incorporating an alternative style of faceplate assembly wherein a button is fashioned as an integral part of a front housing component, rather than a separate component.
Figure 11:
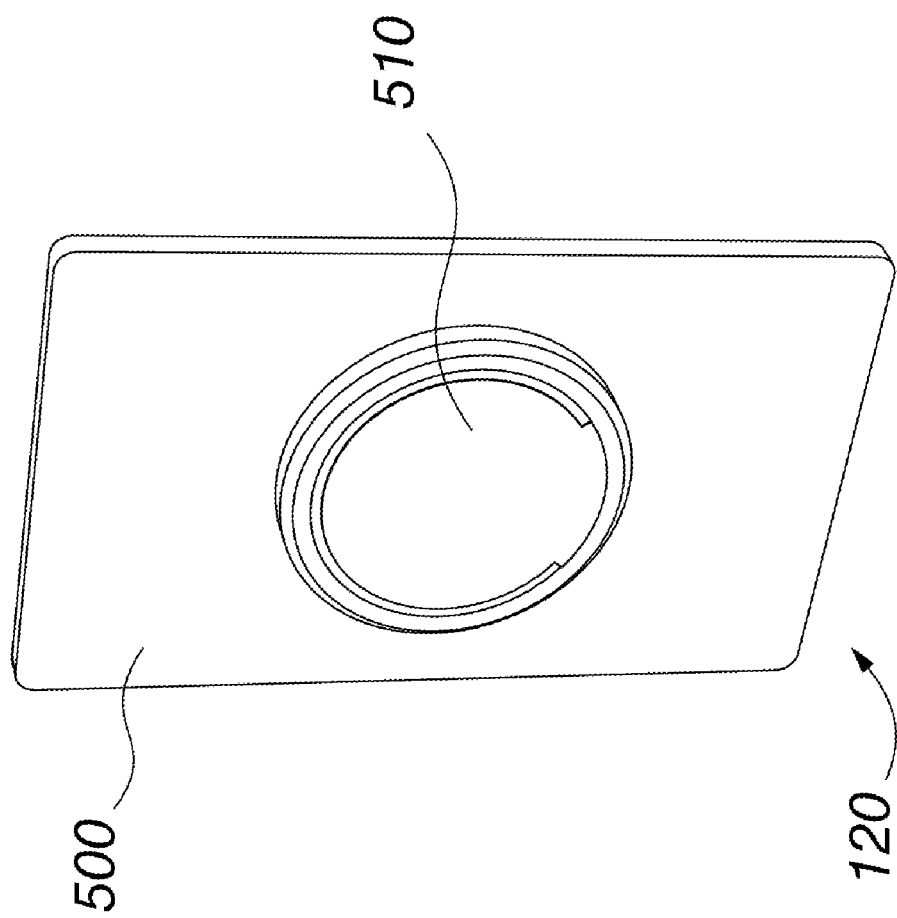
FIG. 11 illustrates an exemplary alternate embodiment of FIG. 1 incorporating an alternative rotary button style.
Figure 12:
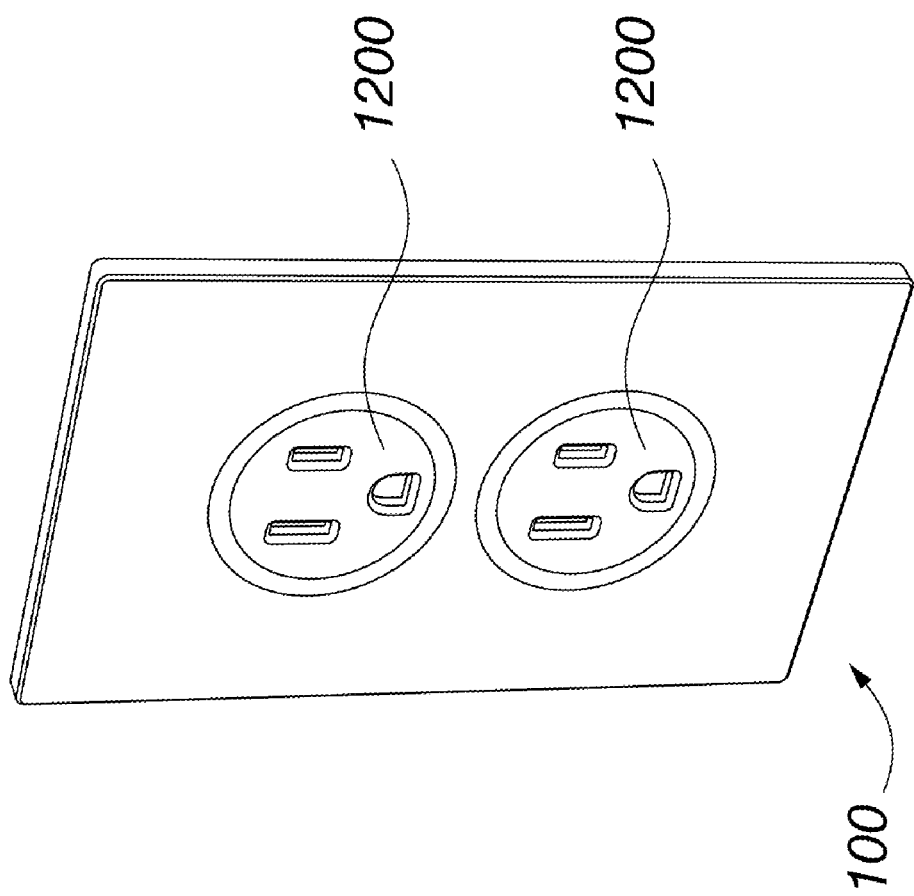
FIG. 12 illustrates an exemplary alternative embodiment of the present invention wherein the described wall-mounted electrical control is fashioned as a duplex electrical receptacle.

Additional embodiments of the present invention are shown in FIGS. 10-12. FIGS. 10 and 11 illustrate alternative embodiments of faceplate assembly 120 of an electrical switch wherein button assembly 510 is fashioned as an integral part of front housing 500 in FIG. 10 and as a rotary knob in FIG. 11.

FIG. 12 illustrates an embodiment wherein wall-mounted electrical control 100 is fashioned as an electrical receptacle instead of a switch. In said embodiment, the components and functionality described above are directed towards a receptacle. All functionality previously described is preserved in said embodiment, with load switching components 430 on electronics assembly 220 of wall-mounted base 110 configured to control power to each of the two electrical outlets 1200 of the illustrated duplex receptacle rather than switching an external electrical circuit as is the case in embodiments wherein the wall-mounted control is fashioned as an electrical switch. Embodiments such as that illustrated in FIG. 12 may also include additional receptacle-specific control electronics such as a ground fault circuit interrupter (GFCI) and arc fault circuit interrupter (AFCI) components and/or be configured such that load switching components 430 automatically turn themselves "on" or "off" as qualified electrical loads are inserted or removed, respectively, from each receptacle, such that receptacles are de-energized when not in use to minimize the risk of electrical shock.

Additionally, embodiments such as that illustrated in FIG. 12 may be directed towards auxiliary receptacle applications wherein electrical outlets 1200 may be replaced by auxiliary receptacles for typical household services such as telephone, cable television, internet, or the like. Said embodiments do not require load switching components 430 as may be the case in switch and electrical receptacle embodiments, but may be desirable to coordinate the aesthetic appearance of all wall-mounted fixtures in a home or office. In said embodiments, light-emitting components 730 on indicator light assembly 710 may serve as status indicator symbols, such as illuminating when a telephone is ringing, and/or serve as nightlights in the dark.

Although the present invention has been described in relation to particular embodiments thereof, many other variations and modifications and other uses will become apparent to those skilled in the art. For example, according to various embodiments, the button, AC electrical receptacles, or auxiliary receptacles, could instead be replaced by a decorative lighting element, digital display, or other similar devices as would typically be wall-mounted within a structure. It is preferred, therefore, that the present invention be limited not by the specific embodiments disclosed herein, but only by the appended claims.

What is claimed is:

1. An electrical fixture, comprising:
   at least two modules, the modules comprising a power module comprising first mechanical latch parts and a user interface module comprising second mechanical latch parts wherein the first and second mechanical latch parts are arranged to cooperate to releasably latch the user interface module to the power module such that the first mechanical latch parts physically retain the user interface module to the power module in cooperation with the second mechanical latch parts;
   the power module configured for attachment to a wall opening or receptacle box, the power module comprising:
   i. an electrical main connection point for connecting the power module to an electrical main carrying AC line voltage electrical power;
   ii. a flange arranged to cover the wall opening or an opening of the electrical receptacle box to prevent exposure to the electrical main connection point;
   iii. a first electrical connection point for detachably electrically connecting the power module to the user interface module;
   iv. electronic components for regulating delivery of AC line voltage electrical power from the electrical main connection point to fixture-controlled loads in response to power control signals from the user interface module and for delivering low voltage electrical power to the user interface module; and
   the user interface module, sized to removably attach to the power module while the power module remains installed and in use without removing or disassembling the power module, the user interface module comprising:
   i. an outwardly facing primary surface;
   ii. a user interface comprising one or more control elements operative to receive user input by detecting user interactions with the control elements, the one or more control elements accessible on the primary surface;
   iii. control electronics powered by the low voltage electrical power from the power module, the control electronics comprising a programmable logic element, connected to receive control signals from the user interface that represent the user input and operative in response to the control signals from the user interface to deliver corresponding power control signals to the electronic components of the power module or to a networked electrical fixture;
   iv. a second electrical connection point detachably connectable to the first electrical connection point of the power module, wherein the first and second electrical connection points interact to transmit the low voltage electrical power and communication signals between the power module and the user interface module; and
   v. the second mechanical latch parts.

2. The modular electrical fixture of claim 1 wherein the power module contains an AC-DC power converter connected to receive AC electrical power from the electrical main and operable for producing a DC voltage for powering the user interface module.

3. The electrical fixture of claim 1 wherein the power module contains elements for switching on/off one, or more, connected electrical loads.

4. The electrical fixture of claim 1 wherein the power module contains one or more lights that illuminate when the user interface module is detached from the power module, the one or more lights providing a visual indicator that the power module remains connected to the electrical main.

5. The electrical fixture of claim 1 wherein the user interface module includes lights that may serve as a backlight, night light or communicate device status signals.

6. The electrical fixture of claim 5 wherein the user interface module includes at least one motion sensor connected to control one or more of the lights of the user interface module to illuminate in response to user presence detection.

7. The electrical fixture of claim 1 wherein the user interface module includes wireless communication electronics enabling remote control of said user interface module and facilitating wireless communication with nearby networked devices.

8. The electrical fixture of claim 7 wherein the user interface module includes temperature and/or humidity sensors for monitoring ambient conditions and connected for wirelessly communicating those ambient conditions to a thermostat or climate control device by way of the wireless communication electronics.

9. The electrical fixture of claim 1 wherein the one or more control elements comprise a light switch.

10. The electrical fixture of claim 9 wherein the light switch is a dimmable light switch.

11. The electrical fixture of claim 10 wherein the dimmable light switch comprises a touch sensitive region and the dimmable light switch is operable to perform dimming of a light controlled by the dimmable light switch in response to touches on the touch sensitive region.

12. The electrical fixture of claim 10 wherein the dimmable light switch comprises a rotary dial disposed on the primary surface and operative for controlling a dimming level.

13. An electrical fixture, comprising:
- at least two modules, the modules comprising a power module comprising first mechanical latch parts and a user interface module comprising second mechanical latch parts wherein the first and second mechanical latch parts are arranged to cooperate to releasably latch the user interface module to the power module such that the first mechanical latch parts physically retain the user interface module to the power module in cooperation with the second mechanical latch parts;
- the power module configured for attachment to a wall opening or receptacle box, the power module comprising:
  - i. an electrical main connection point for connecting the power module to an electrical main carrying AC line voltage electrical power;
  - ii. a flange arranged to cover the wall opening or an opening of the electrical receptacle box to prevent exposure to the electrical main connection point;
  - iii. a first electrical connection point for detachably electrically connecting the power module to the user interface module;
  - iv. electronic components for regulating delivery of AC line voltage electrical power from the electrical main connection point to fixture-controlled loads in response to power control signals from the user interface module and for delivering low voltage electrical power to the user interface module; and
- the user interface module, sized to removably attach to the power module while the power module remains installed and in use without removing or disassembling the power module, the user interface module comprising:
  - i. an outwardly facing primary surface;
  - ii. a user interface comprising one or more control elements operative to receive user input by detecting user interactions with the control elements, the one or more control elements accessible on the primary surface;
  - iii. control electronics powered by the low voltage electrical power from the power module, the control electronics comprising a programmable logic element, connected to receive control signals from the user interface that represent the user input and operative in response to the control signals from the user interface to deliver corresponding power control signals to the electronic components of the power module or to a networked electrical fixture;
  - iv. a second electrical connection point detachably connectable to the first electrical connection point of the power module, wherein the first and second electrical connection points interact to transmit the low voltage electrical power and communication signals between the power module and the user interface module; and
  - v. the second mechanical latch parts;
- wherein the one or more control elements comprise a dimmable light switch comprising a rotary dial disposed on the primary surface and operative for controlling a dimming level and the rotary dial is detachably magnetically coupled to the primary surface of the user interface module and comprises a wireless data interface such that the rotary dial, when detached from the user interface module, is operable to remotely control light dimming by wireless communication with the user interface module.

14. The electrical fixture of claim 10 wherein the control electronics of the user interface module comprise an ambient light sensor and are configured to adjust a light dimming level of the dimmable light switch automatically in response to changes in ambient light level sensed by the ambient light sensor to maintain a constant light intensity in the vicinity of the user interface module.

15. The electrical fixture of claim 10 wherein the user interface module comprises a realtime clock and the control electronics of the user interface module are configured to set a light dimming level of the dimmable light switch automatically in response to time indicated by the realtime clock.

16. The electrical fixture of claim 1 comprising an electrical receptacle.

17. The electrical fixture of claim 16 wherein the control electronics of the user interface module comprises a load detector circuit configured to energize the electrical receptacle only when the load detector circuit detects that a qualified electrical load is connected to the receptacle.

18. The electrical fixture of claim 1 comprising one or more of: a cable, telephone, or network connection port.

19. The electrical fixture of claim 1 comprising a thermostat or climate control device.

20. The electrical fixture of claim 1 comprising a display screen.

21. The electrical fixture of claim 1 comprising a wireless network signal repeater.

22. The electrical fixture of claim 1 wherein the user interface module comprises a customizable aesthetic element for coordinating with home décor and wall paint colors, the aesthetic element comprising a detachable faceplate.

* * * * *